Aug. 28, 1956 H. A. ROBINSON 2,761,066

HARMONIC GENERATOR

Filed Oct. 25, 1951 2 Sheets-Sheet 1

INVENTOR
Harris A. Robinson
BY
Charles H. Brown
ATTORNEY

Aug. 28, 1956 H. A. ROBINSON 2,761,066

HARMONIC GENERATOR

Filed Oct. 25, 1951 2 Sheets-Sheet 2

INVENTOR
Harris A. Robinson
BY
Charles H. Brown
ATTORNEY

United States Patent Office 2,761,066
Patented Aug. 28, 1956

2,761,066

HARMONIC GENERATOR

Harris A. Robinson, Philadelphia, Pa., assignor, by mesne assignments, to the United States of America as represented by the Secretary of the Air Force Application October 25, 1951, Serial No. 253,141

7 Claims. (Cl. 250—36)

This invention relates to a harmonic generator, and more particularly to a harmonic generator which has special utility in connection with a multichannel frequency generating system.

Recently, there has been developed a radio communication transmitter-receiver which makes available for frequency selection any one frequency channel of 44,000 which are spaced 500 cycles apart through the frequency range of 2 mc. to 24 mc. For such a transmitter-receiver, a 44,000-channel frequency generator with a very high frequency stability is required. Such a generator includes a plurality of cascaded mixers in the first of which the output of the master (controlled) oscillator is mixed with the output of a switchable, tunable harmonic frequency generator in turn energized by a highly stable crystal oscillator. In several of the following mixers of such a generator the output of the preceding mixer, after being filtered and then amplified, is mixed with the respective output of a switchable, tunable harmonic frequency generator in turn energized by fixed frequency divider stages supplied by the same crystal oscillator. The output of the final mixer is fed to a phase discriminator to which is also fed a crystal-controlled stable frequency and the output of this discriminator controls the master oscillator. In the harmonic generators mentioned, any one of a number of harmonics of a lower frequency source may be selected dependent upon the channel selection switch setting.

The proper operation of a frequency generator of the type described requires the maintenance of a certain signal level at the phase discriminator, and is based on the presence of a constant signal level for all mixers. This is so because each mixer develops a number of spurious frequencies if the signal input level thereto rises or falls from a standard or normal value. It is of course desirable in a frequency generator of this type, for accurate frequency control, that the spurious frequencies out of the mixers be minimized; this requires that the input signal level to such mixers be maintained substantially constant.

Therefore, an object of this invention is to devise a tunable harmonic generator which provides a substantially constant output level over a wide range of selected harmonics.

Another object is to provide a circuit arrangement which compensates for the natural decrease in amplitude with increase in harmonic number of the output of a harmonic frequency generator.

A further object is to devise a circuit arrangement for a harmonic generator which permits the AVC circuit of the generator to function more effectively, thus providing a more nearly constant output from the generator.

Figure 1:
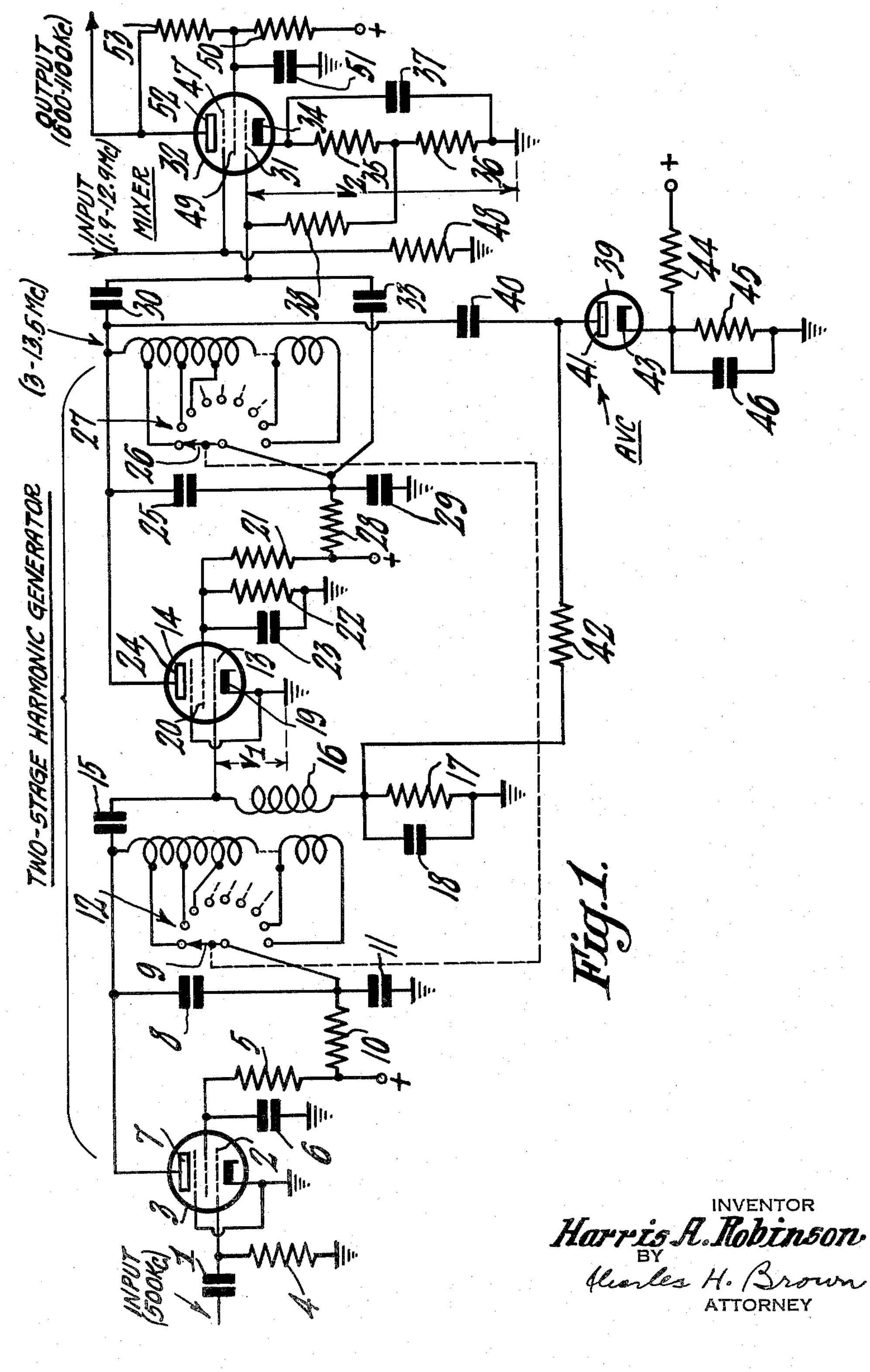
Figure 2A:
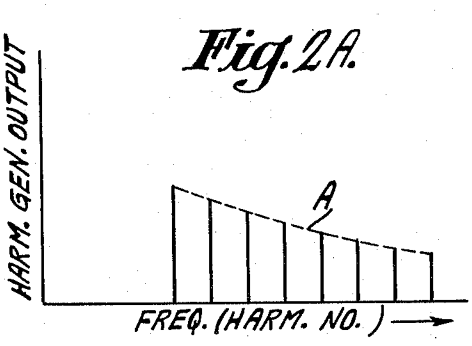
Figure 2B:
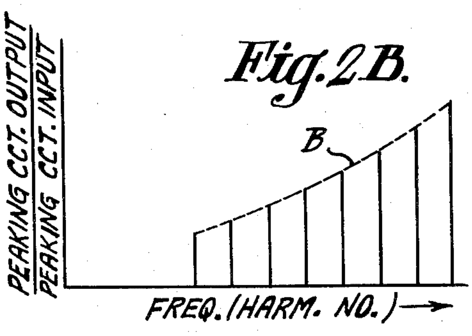
Figure 2C:
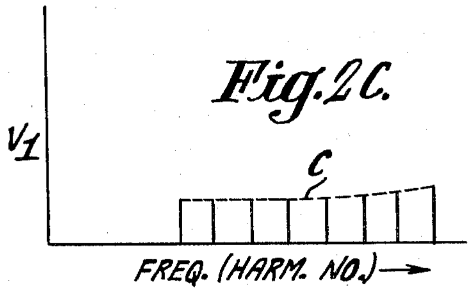

The foregoing and other objects of the invention will be best understood from the following description of an exemplification thereof, reference being had to the accompanying drawings, wherein:

Fig. 1 is a schematic representation of a circuit according to this invention; and Figs. 2A, 2B and 2C are harmonic frequency spectra useful in explaining the invention.

The objects of this invention are accomplished, briefly, in the following manner: An inductance-capacitance resonant series network, resonant at a frequency higher than that of the highest harmonic desired to be utilized, is used to couple an oscillatory circuit, wherein the harmonic frequencies appear, to the input electrodes of a vacuum tube harmonic amplifier stage. The voltage across the inductance of this network is fed to the input electrodes of the amplifier. An AVC circuit, responsive to the amplifier stage output, provides a gain-controlling bias effective on these input electrodes. The oscillatory circuit mentioned is tunable in discrete steps to select any one of a large number of harmonics. The series network serves as a peaking circuit to counteract the natural loss in amplitude of the higher frequency harmonics appearing across the oscillatory circuit, which is in the output of a harmonic generator stage.

In a typical frequency generator of the 44,000-channel type previously discussed, there are three harmonic generators, supplied with 500 kc., 50 kc. and 5 kc. respectively. By way of example, the 500 kc. harmonic generator will be described. Referring to Fig. 1, the 500 kc. input is supplied from a fixed frequency source, such as a crystal-controlled oscillator, through a coupling capacitor 1 to the control grid 2 of a pentode vacuum tube 3 which functions as a harmonic generator. A grid leak resistor 4 is connected from the grid side of capacitor 1 to ground. The suppressor grid of tube 3 is tied to its cathode, which is grounded. The screen grid of tube 3 is supplied through the usual resistor 5 from the positive terminal of the unidirectional potential source and is provided with the usual bypassing capacitor 6. The anode 7 of tube 3 is connected to a parallel tuned oscillatory circuit 12 including a capacitor 8 and, in shunt thereto, a variable inductance the total inductance value of which may be selected and changed in discrete steps by means of the switch 9 which is a channel selection switch and which engages any selected one of a plurality of fixed contacts (in the actual embodiment built, these were twenty-two in number) connected to different portions of a single inductance or to different inductances which are connected in series with each other. To complete the tuned circuit 12, the upper end of the single inductance or the upper one of the several inductances is connected to the anode 7 and the upper plate of capacitor 8, while the movable arm of the 22-position switch 9 is connected to the lower plate of capacitor 8 and also through a resistor 10 to the positive source to supply anode potential to tube 3. A bypass capacitor 11 is connected from the lower plate of capacitor 8 to ground.

The tube 3 with its circuit described functions as a harmonic generator and develops a harmonic spectrum such as illustrated in Fig. 2A, in which frequency or harmonic number is plotted against harmonic generator output. It will be seen from this figure, as indicated by the dotted line A joining the ends of the several spectral lines, that the voltage output of the harmonic generator so far described decreases as the frequency or harmonic number increases.

In a particular embodiment of this invention, as previously indicated, the switch 9 had twenty-two positions. Any particular one of the 6th through 27th harmonics of the 500 kc. input could then be selected by operation of this switch, which means that the output frequency range of the harmonic generator which was utilized extended from 3 mc. to 13.5 mc., a frequency ratio of 4.5:1. Over this large range of harmonic frequencies, as may be seen from Fig. 2A, the harmonic frequency spectrum generated by the harmonic generator including tube 3, and appearing across the tuned output circuit 12 (including capacitor 8 and the switchable inductance or inductances) as switch 9 is moved, is rather nonuniform as regards amplitude, the harmonic generator output falling off in amplitude as higher frequencies or higher harmonic numbers are selected. An objective of this invention is to furnish relatively constant excitation to the grid of a mixer tube to be later referred to, for any desired harmonic selected by the operation of switch 9.

In the conventional circuit, the selected harmonic output voltage across tuned circuit 12, in which circuit harmonics of the 500 kc. fundamental input frequency appear, is coupled by a coupling capacitor and a conventional grid resistor to excite the grid of a second vacuum tube stage which constitutes a harmonic amplifier. An AVC arrangement including a diode, provided with so-called "delay," is coupled to receive a portion of the output of this second stage, to rectify it and to apply the rectified voltage as a control grid bias to the second stage. In this conventional coupling arrangement including the coupling capacitor and grid resistor, the use of a delayed AVC diode for the purpose of obtaining constant grid drive to the following mixer stage is ineffective for two reasons, one because there is inherently a very wide variation in amplitude of harmonic frequency output from the second stage resulting from the variation in grid drive for this stage which is illustrated in Fig. 2A, and the other because the AVC arrangement must operate by bias variation on a grid (the grid of the second stage or amplifier) which is already over-driven and developing considerable self-bias, particularly on the stronger lower order harmonics.

According to this invention, the desired substantially constant signal level at the grid of the mixer, which follows the second stage of the harmonic generator, is obtained by using a series inductance-capacitance coupling network between tuned circuit 12 and the control grid 13 of the second stage tube 14, the grid drive for the second stage tube 14 being taken from across the inductance of this network.

More particularly, with reference to Fig. 1, the anode 7 and the upper end of circuit 12 are connected through a capacitor 15 to the control grid electrode 13 of a pentode vacuum tube or electron control device 14 which constitutes a harmonic amplifier. One end of an inductor 16 is connected to control grid 13, while the opposite end thereof is connected through a parallel RC filter network, consisting of a resistor 17 and a capacitor 18, to ground. The cathode 19 of tube 14 is grounded, while the network 17, 18 has a very low impedance at the harmonic frequencies. Therefore, the lower end of inductance 16 is held essentially at ground potential for harmonic frequencies, so that the effective grid drive (between grid 13 and cathode 19) for tube 14 is taken from across the inductance 16.

The inductance 16 and capacitor 15 together form a series inductance-capacitance (LC) network which is resonant at a selected frequency (for example, 19 mc.) which is considerably higher than the frequency of the highest harmonic desired to be utilized. In this way, and by control of the Q of inductor 16, the series network 15, 16 serves as a peaking circuit and has an output/input characteristic of the type illustrated in spectrographic form in Fig. 2B, the dotted line B joining the ends of the several spectral lines indicating that the ratio of output to input of the peaking circuit rises or increases as the frequency or harmonic number increases. The ratio of peaking circuit output to peaking circuit input might be termed "gain," so that the peaking circuit 15, 16 has a rising gain-versus-frequency characteristic as illustrated in Fig. 2B.

The rising characteristic of Fig. 2B (which is applicable to the peaking circuit 15, 16 which is directly coupled to the harmonic generator output appearing in circuit 12) tends to compensate or counteract the falling generator output-versus-frequency spectrum characteristic of Fig. 2A, which latter characteristic represents the natural loss in amplitude of the higher frequency harmonics produced by the first harmonic generator stage including tube 3 and circuit 12.

In general, with the resonant frequency of 15, 16 considerably higher than the frequency of the highest harmonic desired from the tuned circuit 12, the resultant drive voltage $V_1$ applied to the grid 13 of the second stage tube 14 may be maintained substantially constant in amplitude with frequency and of considerably lower amplitude as compared to the conventional capacitor-resistor coupling. The resultant voltage $V_1$ is plotted against frequency or harmonic number in spectrum fashion in Fig. 2C. As indicated by the dotted line C joining the ends of the several spectral lines, the drive voltage $V_1$ is substantially constant or invariable with frequency or harmonic number.

The suppressor grid of tube 14 is connected to cathode 19, while the screen grid 20 of this tube is connected through a resistor 21 to the positive potential source, a bypassing parallel RC network consisting of resistor 22 and capacitor 23 being connected between grid 20 and ground. The anode or output electrode 24 of tube 14 is connected to a parallel tuned circuit 27 including a capacitor 25 and, in shunt thereto, a variable inductance the total inductance value of which may be selected and changed in discrete steps by means of the switch 26 which is ganged with switch 9, which is also a channel selection switch and which engages any selected one of a plurality of fixed contacts (in the actual embodiment built, these were twenty-two in number) connected to different portions of a single inductance or to different inductances which are connected in series with each other. To complete the tuned circuit 27, the upper end of the single inductance or the upper one of the several inductances is connected to the anode 24 and the upper plate of capacitor 25, while the movable arm of the 22-position switch 26 is connected to the lower plate of capacitor 25 and also through a resistor 28 to the positive source to supply anode potential to tube 14. A bypass capacitor 29 is connected from the lower plate of capacitor 25 to ground.

The tube 14 with its circuit described functions as a harmonic amplifier to amplify and further select the particular harmonic supplied to control grid 13.

Switch 26, like switch 9 and ganged therewith, has twenty-two positions and may function to select any particular one of the 6th through 27th harmonics of the 500 kc. input, which means that the range of frequencies in the lead connected to anode 24 may be from 3 mc. to 13.5 mc., as indicated.

The anode 24 and the upper end of circuit 27 are connected through a coupling capacitor 30 to one input grid 31 of a mixer tube 32, while the movable arm of switch 26 is connected through a capacitor 33 to this same grid, thus forming a capacitive voltage divider. The cathode 34 of tube 32 is connected to ground through a biasing network consisting of a pair of series-connected resistors 35 and 36 across which is connected a capacitor 37. A resistor 38 is connected from grid 31 to the common junction of resistors 35 and 36. It is the grid excitation voltage $V_2$ of mixer tube 32 which is maintained relatively constant by the circuit of this invention. The voltage $V_2$ is that supplied to grid 31 relative to ground. In other words, according to this invention the harmonic generator output $V_2$ driving the mixer grid 31 is maintained substantially constant for any selected harmonic.

A delayed AVC arrangement including a diode 39 is coupled to the output of the second stage 14. A connection extends from anode 24 of this stage through a coupling capacitor 40 to the anode 41 of diode 39. The rectified voltage from diode 39 is fed through resistor 42 to the lower end of inductance 16, being filtered by 17 and 18. The rectified voltage is applied via 16 to control grid 13 of the second stage as an AVC bias therefor. "Delay" for this AVC arrangement is provided by biasing the cathode 43 of diode 39 positively with respect to its anode. A pair of resistors 44 and 45 are connected in series between the positive terminal of the unidirectional source and ground to constitute a voltage divider, the cathode 43 being connected to the junction point of these two resistors. Resistor 45 is bypassed by capacitor 46.

The type of excitation described for grid 13 of the second stage, using the peaking circuit 15, 16, permits the effective functioning of the delayed AVC arrangement since both of the limitations previously discussed have been corrected. More particularly, the variation in grid drive with frequency for the second stage 14 has been made almost nil (see Fig. 2C), resulting in substantially no variation in amplitude with frequency of output from this stage. Also, the AVC arrangement operates by bias variation on grid 13 which is not now over-driven (see the rather low amplitude of drive voltage $V_1$ in Fig. 2C) and which is therefore not developing self-bias. Since the delayed AVC is now permitted to function very effectively, the harmonic generator output voltage $V_2$ driving the mixer grid 31 is substantially constant with frequency. Stated in another way, the output level from the two-stage harmonic generator of this invention is substantially constant over a wide range of selected harmonics.

Another input grid 47 of mixer tube 32 is supplied from a suitable source of signals, which for example may lie in the frequency range of 1.9 mc. to 12.9 mc. In a multichannel frequency generating system of the type previously referred to herein, the signal supplied to grid 47 may be derived from the master (controlled) oscillator. A resistor 48 connects grid 47 to ground.

The remaining grid 49 of tube 32 is connected through a resistor 50 to the positive terminal of the unidirectional potential source and is provided with a bypass capacitor 51. The anode 52 of this tube is connected through a resistor 53 to the grid end of resistor 50.

Mixing of the two frequencies supplied to tube 32 takes place in such tube, resulting in the production of a beat frequency voltage at anode 52 which may vary anywhere from 600 kc. to 1100 kc. as channel switching takes place.

Although the invention is not to be deemed limited in any way thereby, the following component values are given by way of example. These were the values used in a circuit built according to this invention and successfully tested in operation.

| | |
|---|---|
| Tube 3 | Type 5840. |
| Tube 14 | Type 5840. |
| Tube 32 | Type 5636. |
| Tube 39 | Type 5896. |
| Resistor 4 | 330,000 ohms. |
| Resistor 5 | 180,000 ohms. |
| Resistor 10 | 4,700 ohms. |
| Resistor 17 | 220,000 ohms. |
| Resistor 21 | 47,000 ohms. |
| Resistor 22 | 22,000 ohms. |
| Resistor 28 | 4,700 ohms. |
| Resistor 35 | 470 ohms. |
| Resistor 36 | 220 ohms. |
| Resistor 38 | 470,000 ohms. |
| Resistor 42 | 100,000 ohms. |
| Resistor 44 | 120,000 ohms. |
| Resistor 45 | 2,200 ohms. |
| Resistor 48 | 470,000 ohms. |
| Resistor 50 | 4,700 ohms. |
| Resistor 53 | 22,000 ohms. |
| Capacitor 1 | 47 mmfd. |
| Capacitor 6 | 5,000 mmfd. |
| Capacitor 8 | 100 mmfd. |
| Capacitor 11 | 5,000 mmfd. |
| Capacitor 15 | 18 mmfd. |
| Capactor 18 | 10,000 mmfd. |
| Capacitor 23 | 5,000 mmfd. |
| Capacitor 25 | 47 mmfd. |
| Capacitor 29 | 5,000 mmfd. |
| Capacitor 30 | 120 mmfd. |
| Capacitor 33 | 470 mmfd. |
| Capacitor 37 | 5,000 mmfd. |
| Capacitor 40 | 100 mmfd. |
| Capacitor 46 | 10,000 mmfd. |
| Capacitor 51 | 5,000 mmfd. |

What is claimed is:

1. In combination, an electron control device amplifying stage the device of which has a control electrode and output electrodes, a tunable circuit wherein harmonics of a fundamental frequency appear, means for adjustably tuning said circuit to any one of a plurality of predetermined harmonics of said fundamental frequency, a resonant network having a resonant frequency higher than the frequency of the highest one of said plurality of harmonic frequencies, means coupling said network to said circuit, means for applying the voltage appearing across only a portion of said network to said control electrode, means coupled to said output electrodes for rectifying a portion of the output of said stage, and means for applying the rectified voltage to said control electrode as an AVC voltage for said stage.

2. In combination, a tunable circuit wherein harmonics of a fundamental frequency appear, means for adjustably tuning said circuit to any one of a plurality of predetermined harmonics of said fundamental frequency, an inductance-capacitance resonant network having a resonant frequency higher than the frequency of the highest one of said plurality of harmonic frequencies, means coupling said network to said circuit, and means for utilizing the voltage appearing across solely the inductance of said network.

3. In combination, an electron control device amplifying stage the device of which has a control electrode and output electrodes, a tunable circuit wherein harmonics of a fundamental frequency appear, means for adjustably tuning said circuit to any one of a plurality of predetermined harmonics of said fundamental frequency, a series resonant network having a resonant frequency higher than the frequency of the highest one of said plurality of harmonic frequencies, means coupling said network to said circuit, means for applying the voltage appearing across only a portion of said network to said control electrode, means coupled to said output electrodes for rectifying a portion of the output of said stage, and means for applying the rectified voltage to said control electrode as an AVC voltage for said stage.

4. In combination, an electron control device amplifying stage the device of which has a control electrode and output electrodes, a tunable circuit wherein harmonics of a fundamental frequency appear, means for adjustably tuning said circuit to any one of a plurality of predetermined harmonics of said fundamental frequency, a series inductance-capacitance resonant network having a resonant frequency higher than the frequency of the highest one of said plurality of harmonic frequencies, means coupling said network to said circuit, means for applying the voltage appearing across solely the inductance of said network to said control electrode, means coupled to said output electrodes for rectifying a portion of the output of said stage, and means for applying the rectified voltage to said control electrode as an AVC voltage for said stage.

5. In combination, a tunable circuit wherein harmonics of a fundamental frequency appear, means for adjustably tuning said circuit to any one of a plurality of predetermined harmonics of said fundamental frequency, a series-connected inductance-capacitance resonant network having a resonant frequency higher than the frequency of the highest one of said plurality of harmonic frequencies, means coupling said network to said circuit, and means for utilizing the voltage appearing across solely the inductance of said network.

6. In combination, a tunable circuit wherein harmonics of a fundamental frequency appear, a series-connected inductance-capacitance resonant network having a resonant frequency higher than the frequency of the highest harmonic appearing in said circuit which is desired to be utilized, means connecting said network directly in parallel to said circuit through connections having low impedance at said harmonic frequencies, and means for utilizing the voltage appearing across solely the inductance of said network.

7. In combination, a tunable circuit wherein harmonics of a fundamental frequency appear, means for adjustably tuning said circuit to any one of a plurality of predetermined harmonics of said fundamental frequency, an inductance-capacitance resonant network having a resonant frequency higher than the frequency of the highest one of said plurality of harmonic frequencies, means connecting said network directly in parallel to said circuit through connections having low impedance at said harmonic frequencies, and means for utilizing the voltage appearing across solely the inductance of said network.

References Cited in the file of this patent

UNITED STATES PATENTS

| | | |
|---|---|---|
| 1,678,199 | Rettenmeyer | July 24, 1928 |
| 2,082,517 | Rust | June 1, 1937 |
| 2,221,086 | Foster | Nov. 12, 1940 |
| 2,254,114 | Wilson | Aug. 26, 1941 |
| 2,384,263 | Schlesinger | Sept. 4, 1945 |
| 2,424,905 | Sheldorf | July 29, 1947 |
| 2,532,347 | Stodola | Dec. 5, 1950 |
| 2,581,159 | Achenbach | Jan. 1, 1952 |
| 2,660,704 | Harmon et al. | Nov. 24, 1953 |
| 2,664,510 | Russo | Dec. 29, 1953 |
| 2,688,701 | Norton | Sept. 7, 1954 |